United States Patent
O'Keeffe et al.

(10) Patent No.: US 7,349,335 B2
(45) Date of Patent: Mar. 25, 2008

(54) PACKET METERING IN HIGH-SPEED NETWORK UNITS

(75) Inventors: Daniel Martin O'Keeffe, Dublin (IE); Michael Joseph Gleeson, Dublin (IE); Kevin Loughran, Castleblaney (IE); Christopher Alan Walker, Watford (GB)

(73) Assignee: 3Com Corporation, Marlborough, MA (US)

( * ) Notice: Subject to any disclaimer, the term of this patent is extended or adjusted under 35 U.S.C. 154(b) by 533 days.

(21) Appl. No.: 11/032,762

(22) Filed: Jan. 11, 2005

(65) Prior Publication Data
US 2006/0104216 A1 May 18, 2006

(51) Int. Cl.
*G01R 31/08* (2006.01)
(52) U.S. Cl. .................. 370/229; 370/232; 370/252
(58) Field of Classification Search ............. None
See application file for complete search history.

(56) References Cited

U.S. PATENT DOCUMENTS 6,724,721 B1  4/2004  Cheriton
6,724,768 B1 * 4/2004  Melvin ................... 370/412
2003/0103451 A1 * 6/2003  Lutgen et al. ........... 370/229
2004/0032826 A1 * 2/2004  Sridhar .................. 370/222

FOREIGN PATENT DOCUMENTS

EP    1 209 861 A1   5/2002
WO   WO 2001/91406 A1   11/2001

OTHER PUBLICATIONS

Search Report for Application No. GB 0425306.8.

\* cited by examiner

*Primary Examiner*—Chau Nguyen
*Assistant Examiner*—Hicham B Foud

(57) ABSTRACT

For each metered flow in a network unit there is a memory entry which defines a time stamp and a rate parameter. When a packet in the respective flow arrives, the time of arrival is compared with the time stamp. If the time of arrival is before the time stamp the packet is discarded. If the packet arrives after the date stamp, it is allowed to proceed and a new time stamp is computed in accordance with the rate parameter. One exemplary computation adds to the time stamp a time interval obtained by dividing the size of the packet by the rate parameter and preferably subtracting from the quotient the time interval between the arrival time and the previous time stamp.

16 Claims, 3 Drawing Sheets

PACKET METERING IN HIGH-SPEED NETWORK UNITS

FIELD OF THE INVENTION

This invention relates to packet-switched communication systems and particularly to packet metering in network units such as switches and routers.

BACKGROUND TO THE INVENTION

It is normal practice to meter, or regulate, the traffic flows in network units such as switched and routers. The general purpose is to ensure so far as practicable that all the users of a network have fair access. In general, the traffic (i.e. the aggregate of the flows of packets) in a network comprises a variety of different protocols, such as TCP/IP (Transmission Control Protocol/Internet Protocol), UDP (User Datagram Protocol), FTP (file Transfer protocol) and so on. All traffic which flows through a network unit is normally stored in memory temporarily while a lookup is performed to determine the destination (local or remote or both) of the packet and for the completion of other processing which may be necessary or desirable before the packet is forwarded from the unit. Since memories are of finite size the phenomenon of congestion is an ever-present threat. It may arise in a given unit because there is congestion down stream, so that packets cannot be transmitted from the unit from at least some output ports while that downstream congestion persists; or the unit receives at input ports input flows which are greater than the unit can accommodate for more than brief periods.

Some protocols (such as TCP) include congestion control features, but others, such as UDP, do not.

The ultimate remedy for congestion in a unit is for the unit to 'drop' i.e. discard packets. However, such a remedy cannot be applied indiscriminately. Some flows may be constituted by packets conforming to a protocol which is adaptive, in the sense that they include two-way communication that enables a sender to determine whether there has been packet loss and cause reduction in the respective data rate. Other protocols do not have this feature. Furthermore, some forms of traffic, though not necessarily occupying a high fraction of the variable bandwidth, are particularly sensitive to packet loss.

A traffic flow may be defined in a variety of different ways. A simply defined flow is characterized by a particular source port or destination port. A flow may be defined by a source port/destination port pair. Fields from different protocol layers may be combined, particularly to identify a TCP flow; a classifier may be a 5-tuple access control list comprising an IPSA (internet protocol source address); an IPDA (internet protocol source address), an 'application' source port number; an 'application' destination port number and a field identifying a transport protocol, such as TCP. Normally each flow may be defined by a multiplicity of criteria and selected by means of a 'classification' or 'rules' engine which examines selected part of packets received by the unit for matching against entries in a 'flow' database.

Packet metering schemes must therefore take into account the fact that a given flow may contain a mix of packets sent with different protocols; that different flows may require greater or lesser bandwidth than others; that that some flows may be non-adaptive and so on; and need to be capable of variable control, so that rate selected for given flow may be adjusted.

The problem of flow rate metering is acerbated by the multiplicity of different flows that may be defined.

One popular scheme for the metering of flow rates employs 'token buckets', usually one such token bucket for each flow. A token bucket is in essence a logical counter which is periodically 'refreshed'. This means that it receives a number of 'tokens' which are conventionally defined as a measure of packet size; for example a token may represent a number of bytes. Normally the bucket has a maximum capacity. For example it may have a capacity for 1000 (1 k) tokens, which may represent 1000 bytes (or some other number depending on the factor of proportionality). Each time a packet belonging to the respective flow is received, the size of the packet (in units of tokens) is compared with the content of the bucket. If the size of the packet is greater than the number of tokens in the bucket, the packet is not allowed to proceed, and would usually be discarded by any suitable mechanism. If the size of the packet is less than the number of tokens in the bucket, the packet is allowed to proceed, and tokens are removed from the bucket, in accordance with the size of the packet.

Token bucket systems for metering a multiplicity of flows have several disadvantages. Some arise because the large number of meters have to be implemented in memory, usually a memory block separate from that which stores the packets.

One such particular disadvantage is the need to refresh the bucket at regular intervals. The operation of refreshing necessarily occupies the bandwidth available for access to the memory. Token bucket systems require two kinds of access; one for refreshing and the other for up-dating, whereby the meter is accessed to determine whether there are sufficient tokens for allowing the passage of a packet. The greater the number of meters, the greater the bandwidth required to refresh them and the lesser the bandwidth available for up-dating them. Although one has a choice whether to refresh a bucket with a greater number of tokens at less frequent intervals or a lesser number of tokens at a greater frequency, in practice the latter, which has a greater impact on the bandwidth, is preferred to reduce the occurrence of bursty traffic.

A second disadvantage is inherent in the nature of a token bucket. The bucket will allow packets to pass through the meter as long as there are sufficient tokens in the bucket. There is no restriction on the rate of removal of tokens from the bucket. Therefore there is no restriction on the flow of packets until the bucket is empty (on the normal assumption that a bucket holds tokens to the equivalent of a multiplicity of packets). When a bucket is empty, and requires repeated replenishment before it is full again, there will be a much reduced flow of packets. The consequent alternation of rates, between bursts and drips, is undesirable for a flow of voice data or other data representing events in real time.

There is therefore a need for a metering scheme that is versatile, in that it can accommodate a large number of possible different flows without excessive usage of memory bandwidth and can accommodate a great range of different rates without the inherent susceptibility to the production of bursts of traffic.

SUMMARY OF THE INVENTION

The basis of the present invention is to define for each metered flow a small number of memory fields which with the aid of simple and rapid computation can define a 'gate' which on the passage of a packet closes for a time which is computed in accordance with a rate parameter. The new gating interval may be computed by adding to the current time a time interval which is simply related to the rate parameter held in one of the fields and is also preferably related to the size of the packet. The end (herein called 'time stamp') of the gating interval is stored in another field and so is available for comparison with a current time when the next packet in the flow arrives, and this field is used to store a new end time which defines how long the 'gate' will remain closed. The gate is preferably constituted by some convenient discard mechanism.

The time interval during which a 'gate' will be closed in response to the passage of a packet in the flow may be computed by dividing the size of that packet by the rate parameter. Such a computation is convenient when packet size is a dominant factor in the occupation of bandwidth.

The computation may take into account a difference between the current time and the previous end time, so as to diminish the discard or gating interval by such difference. This allows the overall rate to have regard to an idle time during which a packet has not been received. Thus if the discard interval expires, and a new packet is subsequently received a time $t_d$ later, the ordinary computation of discard interval (size/rate) can be modified to (size/rate)$-t_d$.

The foregoing computation, which imposes a maximum byte rate, and is made more accurate by taking into account the idle time, is not the only one that could be used.

Another possibility is to use a measure of the packet rate (e.g. the number of packets that are attributed to the respective flow and are received in a specified time interval). The gating time may then be computed as (A+1/packet rate) where A is a selectable constant. Such a computation can, as described above, be made more accurate by taking into account the idle time, so as to compute the gating time as (A+1/packet rate)$-t_d$, where $t_d$ is the idle time used above. A yet further possibility is to employ a measure which indicates an interval expressed in terms of how many packets or bytes may be allowed to proceed and then to close the meter after that interval for a specified or computed time interval, which may be dependent on a packet count, or a byte count and/or an idle time.

The metering technique indicated above and to be described in detail below provides several advantages. Since the meter is accessed only when a packet in the respective flow arrives, there is no need for any other refreshment of the meter and accordingly the memory bandwidth that would otherwise be required for refreshment (as in a token bucket system) is available for the ordinary storage and retrieval of packets. Moreover, because the passage of a packet inherently prevents the passage of a closely following packet in the same flow, the traffic flow controlled by the meter is consequently less bursty than it would be through a token bucket meter.

Other features and advantages of the invention will be apparent from the following description of a preferred embodiment with reference to the accompanying drawings.

DETAILED DESCRIPTION

Figure 1:
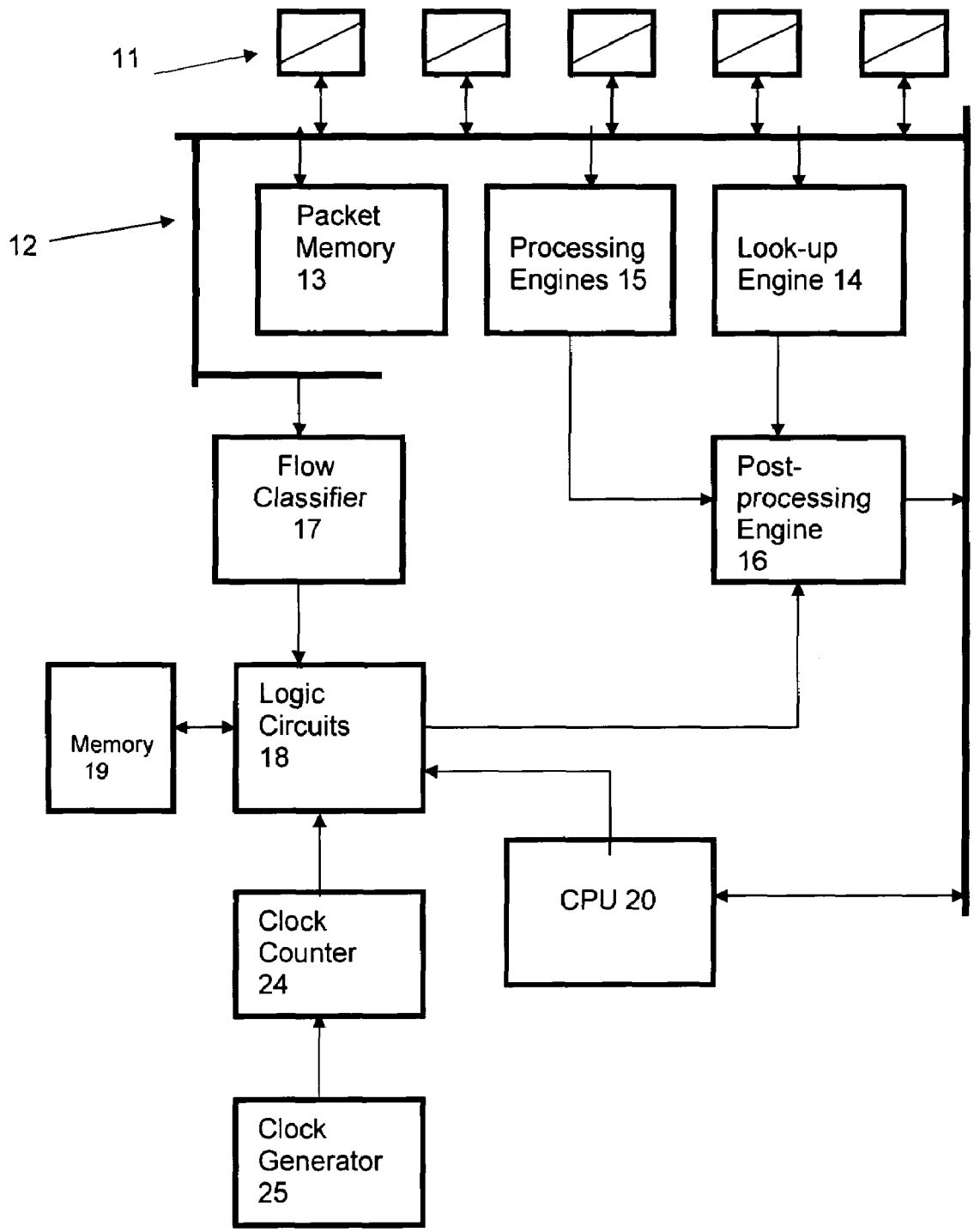
FIG. 1 illustrates schematically a network unit incorporating the invention.

FIG. 1 of the drawings illustrates schematically for the sake of example the principal elements of a network unit such as a switch incorporating the invention. It should be understood that there exists a wide variety of architectures for such network units and the invention is not intended to be limited to any particular variety of architecture. For the most part, a network unit as shown in FIG. 1 is or can be in commonplace form and therefore will be only briefly described.

The unit has a multiplicity of external ports 11 by which the unit can receive addressed data packets and from which addressed data packets can be forwarded. It includes an internal communication system, herein simply represented by a bus 12, by which packets, control signals and commands are conveyed across the unit. The unit includes a main memory 13 which receives packets while they are processed before being forwarded, or in some cases, discarded. When a packet is received, address fields in its header are examined by a lookup engine 14 which determines, with the aid of a lookup or forwarding database (not shown) forwarding data for the packet. As is well known to those skilled in the art, forwarding data for the destination specified in the packet may not exist and therefore the unit may need to perform an address resolution protocol to obtain one. This and other customary features of a unit such as a switch or router will not be described.

The unit usually includes other processing engines 15 which, in accordance with VLAN information, spanning tree information or otherwise, may modify or supplement the forwarding data obtained by the lookup (LU) engine. The actions prescribed by the engines 14 and 15 are collated by a post-processing engine 16 which will (in the absence of any other consideration) produce a final forwarding action based on the forwarding data and in particular produce a 'final' bit mask so that the packet can be sent from the port or ports determined by the forwarding action.

Eventually (for example depending on the state of transmit or output queues defined for each port) a packet is retrieved from memory 13 and passed to the port or ports (if any) specified in the final port bit mask.

The unit includes a central processor (CPU) 20 which for the most part performs operations 30 not directly relevant to the invention.

As thus far described the network unit operates in accordance with known practice.

The unit shown in FIG. 1 includes a metering facility for each of a multiplicity of traffic flows. It is desirable to define, by reference to address data or protocol data or other data a large number of traffic flows which need metering. These flows are determined by a classifier 17 in a manner which is temporally coordinated with but is otherwise independent of the lookup process. In the classifier, in generally known manner, selected contents of a packet, such as address data, 'layer 4' port data, protocol identifiers and so on are employed to determine to which of a selectable multiplicity of flows the packet belongs. The classifier maps, with the aid of logic circuits 18, these flows to one of the meters which are defined in a memory 19, which is preferably a dedicated on-chip memory. It is not necessary to have one meter per actual flow; the classifier defines the flows which are to be metered. In general there will be packets that do not come within any specifically defined flow. It is therefore desirable to have a 'residue' flow which consists of the packets not within the classified flows. This residue flow either would not be metered or may be allotted to a meter which, as will become clear, would always be 'open'.

The relevant purpose of the clock generator 24 and the clock counter 25 in FIG. 1 will be explained with reference to FIG. 2.

Figure 2:
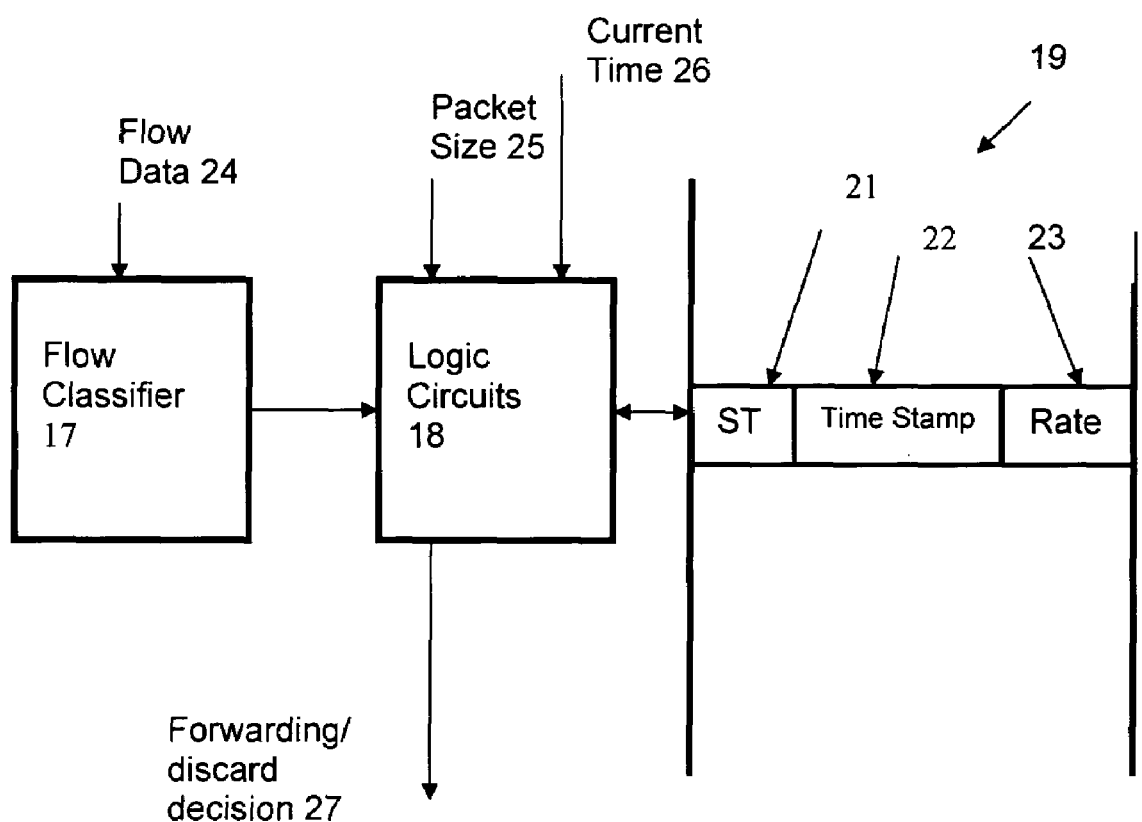
FIG. 2 is a flow chart illustrating the metering technique according to the invention.

FIG. 2 illustrates schematically the implementation of a meter in the memory 19. It comprises three fields 21, 22 and 23. The field 21 is a status field (ST) which indicates the status of the meter, i.e. enabled or disabled. The second field 22 is a 'time stamp' field. The third field 23 is a 'rate'. The widths of the fields 21 and 22 are a matter of choice.

The rate field 23 is preferably programmable. Since there would usually be a large number of flows the programming may be performed with the aid of the CPU 20 and of course may be remotely controlled by a network administrator.

The time field accommodates a 'time stamp', i.e. a specified time (usually expressed as a recycling number of machine or clock cycles) When a packet is received and identified as belonging to the respective flow, a comparison is made between the current time (26) as indicated by the clock counter 24 (FIG. 1) and the time stamp retrieved from field 22. If the current time is earlier than the time stamp, the logic circuits will make a decision to discard the packet. Such a decision (27) will be signaled to the post-processing engine 16, which will discard the packet by any convenient means. If the current time is later than the specified time, the decision 27 is to allow the packet to pass and a new time stamp is computed using the rate field 23 and written into the memory 19. Whether identity between the current time and the time stamp is regarded as earlier or later than the time stamp is a matter of preference.

In this example the computation of the new time stamp comprises adding to the current time a value obtained by dividing the size of the packet by the 'rate'. The size of the packet may be measured in ordinary known manner (e.g. by the counting of bytes) when it arrives and is being written to the packet memory.

The current time is represented by the instantaneous content of the clock counter 24, which counts machine or clock cycles available from a clock generator 25. It is known (for other purposes) to provide such a clock counter, which is preferably a recycling counter.

The computation of a new end time (new time stamp) may comprise adding to the current time a time interval which is defined partly by the rate field. In particular, the time increment may be (in a simpler example) a value obtained by dividing the size of the respective packet by the 'rate'.

The technique can be refined to take into account the time elapsed between the 'opening' of the gate and the arrival of a subsequent packet, i.e. how long the meter has been idle. If the previous time stamp had been $t_n$, the packet size is B and the 'rate' is r, the simpler system above would compute $t_{n+1}$ as $t+B/r$. However, the refinement computes the new time stamp $t_{n+1}$ as $t_{n+1}=t+B/r-(t-t_n)$, where t is the 'current' time.

As noted above there are different ways in which the meter may be applied in practice. Instead of imposing a maximum byte rate, by taking the packet size into account, the meter may impose a maximum packet rate. Thus when a packet is received the gate would be closed after it for a specific time. By measuring the number of packets in the flow received in a given time, one may obtain a rate parameter R. The gate closure time may be computed as $T=(A+1/R)$, where A is a selectable constant (stored in memory) and R is the packet rate, likewise stored in memory. The computation may be made more accurate by taking into account the idle time, such that T is computed as $T=(A+1/R)-(t-t_n)$ where t is the current time and $t_n$ is the previous time stamp. Another possibility is to impose a limit on the opening of the gate. For example, when the meter is accessed it can indicate that it will allow some selected number (X) of packet, or some selected plurality (Y) of bytes to be forwarded. In the latter case Y should be greater than the maximum number of bytes in a packet. The meter can close the gate for an interval computed in accordance with a rate parameter, i.e. packet count, byte count and/or the idle time. This version differs from those previously described in that it may allow a controlled burst of packets.

Figure 3:
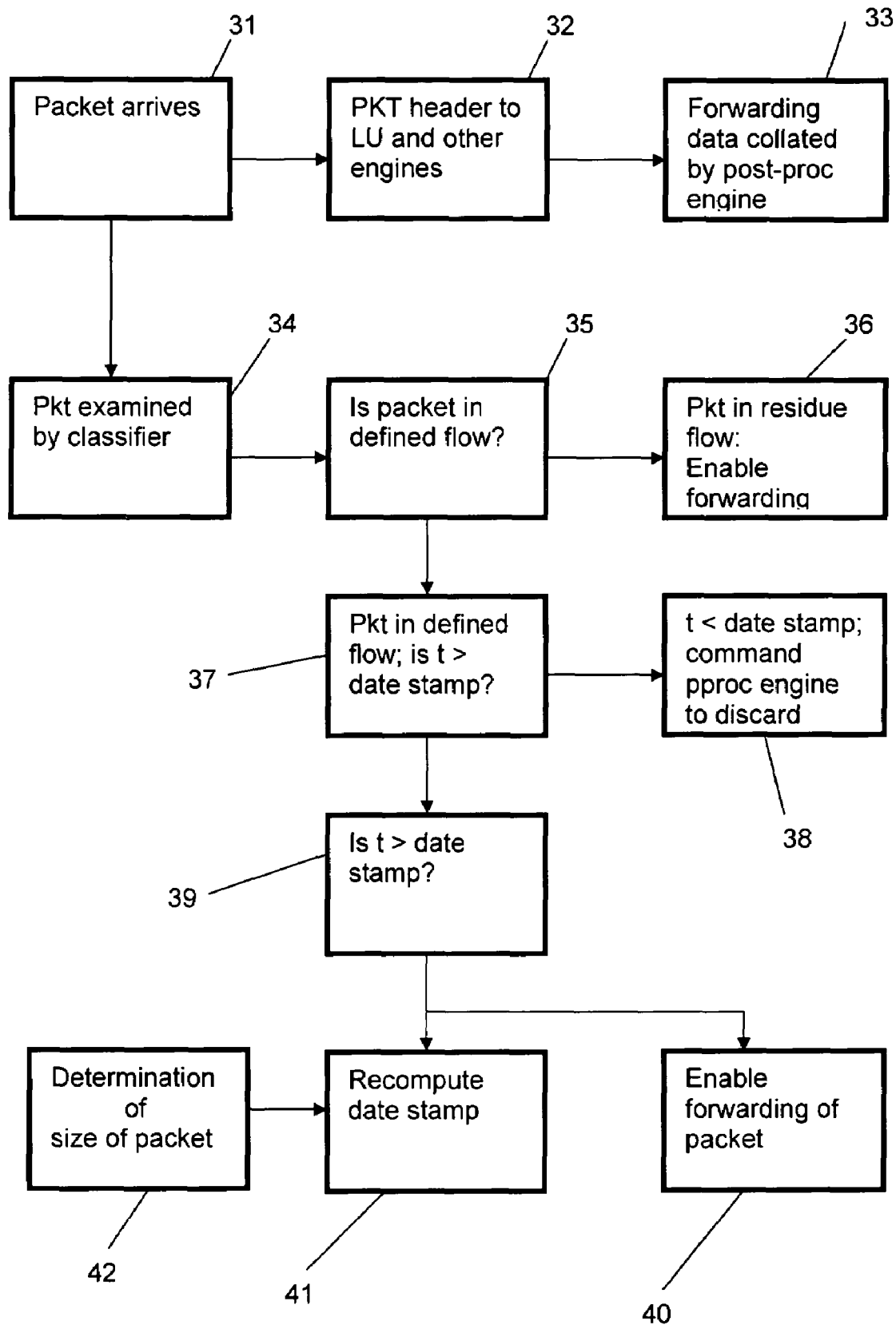
FIG. 3 is a flow diagram illustrating the method of the invention.

FIG. 3 summarizes the preferred method of performing the invention.

On arrival of a packet, (stage 31) the packet is sent to packet memory and selected portions are sent to the lookup engine and the other processing engines (stage 32). These produce forwarding data which is collated by the post-processing engine (stage 33). Meanwhile, the packet is examined by the classifier (stage 34) to determine whether the packet is in a defined flow (stage 35). If it is not in any defined flow it is allotted to a residue flow (stage 36) and the forwarding of the packet is enabled. The current time is compared with the time stamp (stage 37). If the current time is before the time stamp (stage 38) the packet is discarded. If the packet arrives after the time stamp (stage 39), the forwarding of the packet is enabled (stage 40) and the time stamp is recomputed (stage 41) using the packet size which has already been determined (stage 42).

We claim:

1. A method of monitoring a flow of data packets, comprising:
    (a) storing a time stamp defining the end of a gating interval;
    (b) storing a rate parameter;
    (c) determining a data packet to belong to said flow;
    (d) determining whether a time of arrival of said data packet is earlier or later than the time stamp;
    (e) in the event that the time of arrival of said data packet is earlier than the time stamp, discarding the data packet; and
    (f) in the event that the time of arrival of said data packet is later than the time stamp,
        (i) allowing the packet to proceed; and
        (ii) recomputing a new gating interval in accordance with said rate parameter.

2. A method as in claim 1 wherein said new gating interval is computed by adding to said time of arrival a time interval which includes a component that is a function of said rate parameter.

3. A method as in claim 2 wherein said new gating interval is diminished by a component corresponding to the difference between the said time of arrival and the time stamp.

4. A method as in claim 2 wherein the said function of the rate parameter comprises a size value of said data packet divided by said rate parameter.

5. A method of metering a multiplicity of flows of data packets, comprising;
    (a) for each flow, storing a respective first time stamp defining the end of a gating interval;
    (b) for each flow, storing a respective rate parameter; and in response to a data packet:
    (c) determining to which flow said data packet belongs
    (d) determining whether a time of arrival of said data packet is earlier or later than the respective first time stamp;

(e) in the event that the time of arrival of said data packet is earlier than the respective time stamp, discarding said data packet; and (f) in the event that the time of arrival of said data packet is later than the respective time stamp,
  (i) allowing said data packet to proceed; and
  (ii) recomputing a new gating interval in accordance with said rate parameter.

6. A method as in claim 5 wherein said new gating interval is computed by adding to said time of arrival a time interval which includes a component that is a function of said respective rate parameter.

7. A method as in claim 6 wherein said new gating interval is diminished by a component corresponding to the difference between the said time of arrival and the respective time stamp.

8. A method as in claim 6 wherein said function of the respective rate parameter comprises a size value of said data packet divided by said respective rate parameter.

9. Apparatus for metering a multiplicity of flows of data packets, comprising;
  a memory for storing, for each flow, a respective first time stamp defining the end of a gating interval and a respective rate parameter;
  a classifier for determining to which flow a received data packet belongs; and
logic circuits organized:
  (a) to determine whether a time of arrival of said received data packet is earlier or later than the respective first time stamp;
  (b) in the event that the time of arrival of said received data packet is earlier than the respective time stamp, to prescribe discard of said received data packet;
  (c) in the event that the time of arrival of said received data packet is later than the respective time stamp:
    (i) to allow said received data packet to proceed; and
    (ii) to recompute a new gating interval in accordance with said rate parameter.

10. Apparatus as in claim 9 wherein said logic circuits compute said new gating interval by adding to said time of arrival a time interval which includes a component that is a function of said respective rate parameter.

11. Apparatus as in claim 10 wherein said logic circuits diminish said new gating interval by a component corresponding to the difference between the said time of arrival and the respective time stamp.

12. Apparatus as in claim 10 wherein said logic circuits compute the said function of the respective rate parameter as a size value of said received data packet divided by said respective rate parameter.

13. A network unit comprising:
(a) a multiplicity of ports for the reception and forwarding of data packets, apparatus for metering a multiplicity of flows of data packets;
(b) a packet memory for the temporary storage of received data packets;
(c) a lookup engine for examining address data in a received data packet to provide forwarding data for the packet;
(d) a post-processing engine responsive to said forwarding data to determine a forwarding action for said received data packet;
(e) a meter memory for storing, for each of a multiplicities of flows of said data packets, a respective first time stamp defining the end of a gating interval and a respective rate parameter;
(f) a classifier for determining to which of said flows said received data packet belongs; and
(g) logic circuits organized:
  (i) to determine whether a time of arrival of said received data packet is earlier or later than the respective first time stamp;
  (ii) in the event that the time of arrival of said received data packet is earlier than the respective time stamp, to prescribe to said post-processing engine discard of said received data packet; and
  (iii) in the event that the time of arrival of said received data packet is later than the respective time stamp, to recompute a new gating interval in accordance with said rate parameter.

14. A network unit as in claim 13 wherein said logic circuits compute said new gating interval by adding to said time of arrival a time interval which includes a component that is a function of said respective rate parameter.

15. A network unit as in claim 13 wherein said logic circuits diminish said new gating interval by a component corresponding to the difference between the said time of arrival and the respective time stamp.

16. A network unit as in claim 13 wherein said logic circuits compute the said function of the respective rate parameter as a size value of said received data packet divided by said respective rate parameter.

* * * * *